United States Patent [19]

Burnham

[11] Patent Number: 4,535,244
[45] Date of Patent: Aug. 13, 1985

[54] PHOTODOSIMETER

[75] Inventor: Robert E. Burnham, Plymouth, Mich.

[73] Assignee: BPA Calscan, Inc., Plymouth, Mich.

[21] Appl. No.: 496,062

[22] Filed: May 19, 1983

[51] Int. Cl.$^3$ .............................................. G01J 5/32
[52] U.S. Cl. .................................................. 250/372
[58] Field of Search ........................................ 250/372

[56] References Cited

U.S. PATENT DOCUMENTS

| 3,710,115 | 1/1973 | Jubb | 250/372 |
| 3,917,948 | 11/1975 | Strutz | 250/372 |
| 4,428,050 | 1/1984 | Pellegrino et al. | 364/414 |

Primary Examiner—Alfred E. Smith
Assistant Examiner—Constantine Hannaher
Attorney, Agent, or Firm—Gifford, VanOphem, Sheridan, Sprinkle & Nabozny

[57] ABSTRACT

The present invention provides a photodosimeter for use by sunbathers and the like and which activates an alarm when a predetermined radiation dosage has been received by the user. The photodosimeter includes a photocell exposed to the sunlight and which provides an analog output signal to an analog to digital (A/D) converter proportional to the radiation which impinges upon the photocell. The A/D converter provides an output signal to a microprocessor which periodically samples the output from the A/D converter and maintains a count in memory proportional to the radiation exposure. This count is divided by the solar protection factor (SPF) of any sunscreen material which is applied to the user's skin and the SPF factor is inputted to the microprocessor via a keyboard. When the count in the counter exceeds a predetermined maximum, an alarm is activated warning the user that the maximum radiation exposure of the user has been reached.

7 Claims, 2 Drawing Figures

PHOTODOSIMETER

BACKGROUND OF THE INVENTION

I. Field of the Invention

The present invention relates generally to dosimeters and, primarily, to an ultraviolet dosimeter for use by sunbathers.

II. Description of the Prior Art

There are a number of previously known dosimeters which measure the accumulative exposure of a sensor to radiation, such as light. A number of these previously known dosimeters also include optical filters which limit the measured radiation to a predefined range, such as ultraviolet light, and a number of these dosimeters are designed for use by sunbathers in order to prevent sunburns. Examples of these previously known devices can be found in U.S. Pat. No. 3,710,115 to Jubb and U.S. Pat. No. 3,917,948 to Strutz.

Many sunbathers apply a cream or lotion to their skin to protect it from excessive dosage of ultraviolet radiation from the sun and so that the user can remain in sun for longer periods of time without suffering from sunburn. However, it is difficult to determine the accumulative radiation that the sunbather has received since the accumulative radiation depends not only upon the intensity of the sunlight, but also the angle of incidence. In addition, the radiation dosage a sunbather can sustain without burning of the skin depends upon the solar protection factor (SPF) of the sunscreen material.

These previously known dosimeters used by sunbathers do not compensate for the SPF value of sunscreen lotions or creams. The SPF value for such sunscreen lotions or creams are established by the Federal Food and Drug Administration.

SUMMARY OF THE PRESENT INVENTION

The present invention provides a photodosimeter which overcomes the above mentioned disadvantages of the previously known devices.

In brief, the device of the present invention comprises a housing having a photocell secured to the housing and beneath a light diffuser. An optical filter is positioned in between the light diffuser and the photo cell to limit the radiation impinging upon the photocell to the ultraviolet range. It is well known that only ultraviolet rays are responsible for causing sunburns.

The photocell provides an analog output, through a signal conditioner, to an analog to digital (A/D) converter. The A/D converter, in turn, generates a digital output signal to a microprocessor.

A keyboard as well as a displayer are mounted to the housing and the keyboard provides an input signal to the microprocessor. The keyboard enables the user to enter the SPF value of the sunscreen lotion or cream applied by the user to his or her skin. This inputted value is then stored in memory by the microprocessor.

The microprocessor is programmed to periodically sample the output from the A/D converter and maintains an accumulative total of the A/D converter output in a memory unit. This accumulative total is then divided by the SPF factor entered by the user and, when the dividend resulting from the division exceeds a predetermined value, the microprocessor activates an alarm warning the user that a predetermined maximum radiation dosage has been reached.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
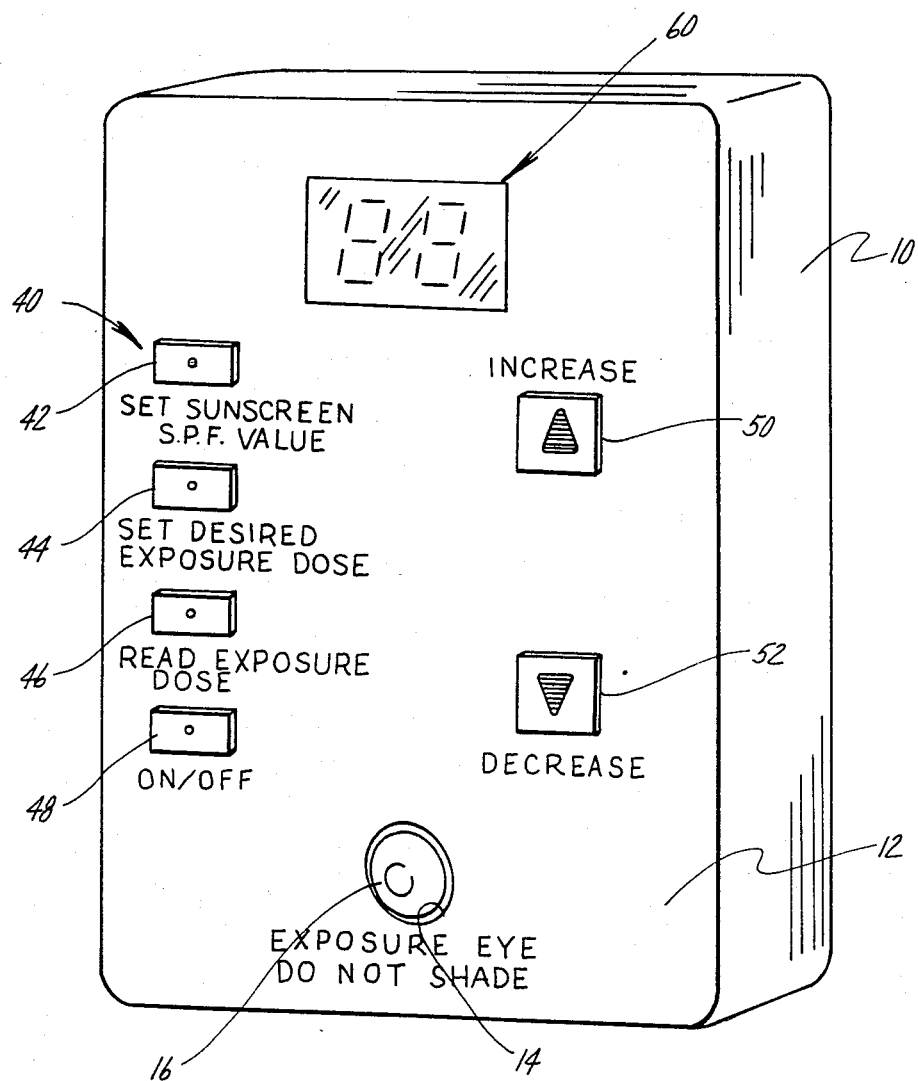
FIG. 1 is a perspective view illustrating a preferred embodiment of the present invention.
Figure 2:
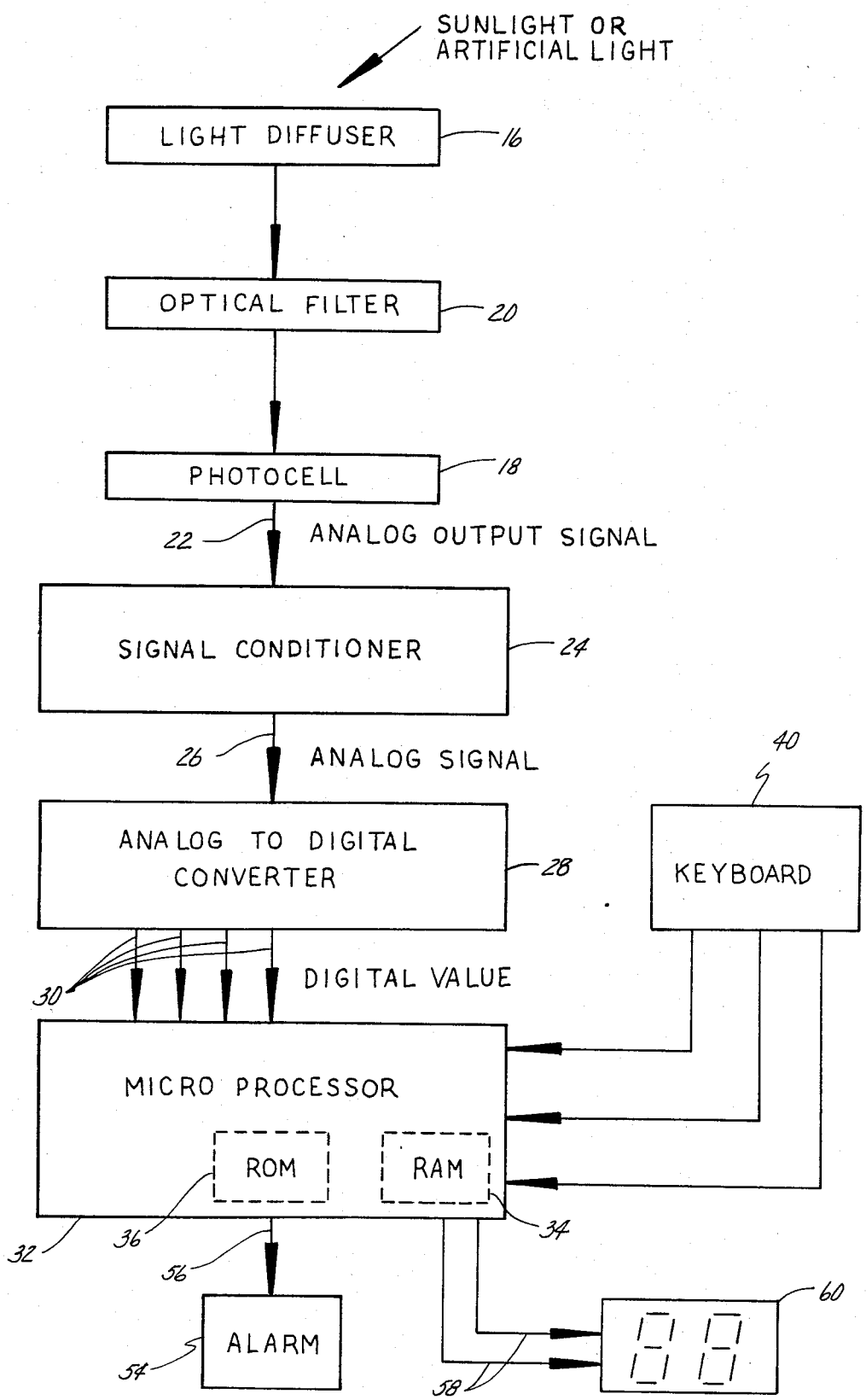
FIG. 2 is a block diagrammatic view of the preferred embodiment of the invention.

With reference to FIGS. 1 and 2, a preferred embodiment of the photodosimeter of the present invention is thereshown and comprises a housing 10 having a top 12. An opening 14 is formed in the housing top 12 and a light diffuser 16 is mounted within this opening 14.

With reference now particularly to FIG. 2, a photocell 18 is mounted within the interior of the housing 10 beneath the light diffuser. An optical filter 20 is positioned in between the diffuser 16 and photocell 18 which blocks the transmission of all radiation from the diffuser 16 and to the photocell 18 except for radiation within the ultraviolet wave length range. This ultraviolet range is approximately the wave length range of 285–325 nanometers.

The photocell generates an analog output signal on an output line 22 which is directly proportional to the dosage of ultraviolet radiation impinging upon the light diffuser 16. The analog output line 22 forms an input signal to a signal conditioning circuit 24 having an analog output line 26. The signal conditioning circuit 24 contains both an amplifier and a threshold circuit so that an output is generated on the signal conditioner output line 26 only when the input to the signal conditioner 24 from the photocell 18 exceeds a predetermined level. A threshold circuit is necessary for the signal conditioner 24 since the photocell 18 provides an output signal even in the absence of any radiation impinging upon the photocell 18.

The output line 26 from the signal condition 24 forms an analog input signal to an analog to digital (A/D) converter 28. The A/D converter, in the well-known fashion, generates a digitally encoded signal on its output buss 30 so that the digital value on the output buss 30 is proportional to the magnitude of the analog input signal from the signal conditioner 24.

Still referring to FIG. 2, the output buss 30 from the A/D converter 28 is coupled to an input data buss 30 of a microprocessor 32. The microprocessor 32 preferably includes internal random access memory (RAM) 34 as well as internal read only memory (ROM) 36 although either the ROM or RAM or both may be external to the microprocessor 32. The purpose of both the RAM and ROM will be subsequently described.

With reference now to FIGS. 1 and 2, a keyboard 40 containing keys 42, 44, 46, 48, 50 and 52 is mounted to the top 12 of the housing 10 and thus accessible by the user. As shown in FIG. 2, the entire keyboard 40 is also connected to and forms an input to the microprocessor 32. The purpose of each key 42–52 will be subsequently described.

Still referring to FIGS. 1 and 2, an audible alarm 54 is electrically connected to an output line 56 from the microprocessor 32. Whenever the voltage of the output line 56 attains a predetermined level, the alarm 54 is activated. Similarly, an output buss 58 from the microprocessor 32 forms an input signal to a digital display 60. Any conventional means can be used for the display 60, such as LED display or liquid crystal display.

The purpose of the keys 40-52 on the keyboard 40 will now be described. The key 48 forms the on/off switch for the photodosimeter and operates in the conventional fashion.

The key 42 operates in conjunction with keys 50 and 52 to set the SPF value of the sunscreen cream or lotion which the user has supplied to use over his skin. In use, the key 42 is depressed and the keys 50 and 52 are used respectively to increase and decrease the SPF value. When the desired SPF value is attained, as displayed on the indicator 60, the key 42 is released and the microprocessor 32, under programmed control, stores the user entered SPF value in the RAM 34.

The key 44 is used to set the exposure between zero and 99 exposure units and, like the key 42, operates in conjunction with the keys 50 and 52 and the indicator 60. The setting for the exposure entered by the user upon depression of the key 44 is determined after experimentation with the dosimeter and is expressed in exposure units proportional to the inverse of the sensitivity of the user's skin. For example, if, after experimentation, the user discovers that his or her skin acquires a minimal sunburn (referred to by the medical profession as "minimal erythermal dosage" or "MED") after accumulating three units of exposure dosage as registered by the photodosimeter, the user will, prior to sun exposure, adjust the exposure set variable in the computer RAM 34 to three units using key 44 in conjunction with keys 50 and 52 until the indicator 60 displays the number three.

The key 46 is used to reset the accumulated ultraviolet radiation exposure to zero.

In operation, the user enters both the SPF value of the sunscreen lotion or cream applied to his or her skin by using key 42 as well as the desired exposure by using key 44. The key 46 is then depressed, resetting the accumulating radiation exposure to zero, and the housing 10 is placed on a surface so that the light diffuser 16 is exposed to the sun or artificial light.

The light passes through the optical filter 20 before impinging upon the photocell 18 so that only ultraviolet radiation impinges upon the photocell 18. The photocell 18 generates an output analog signal to the A/D converter 28 through the signal conditioner 24 which is proportional in magnitude to the amount of ultraviolet radiation impinging upon the photocell 18. The A/D converter generates a digitally encoded signal on its output buss 30 which is connected and fed as data to the input of the microprocessor 32.

A computer program is stored in the read only memory (ROM) 36 which, in addition to storing the inputted SPF and other data values from the keyboard 40, periodically reads the data output from the A/D converter 28 and maintains a running total of the output from the A/D converter 28 in the RAM 34.

The accumulated or total radiation is stored in the random access memory 34 then divided by the SPF value inputted by the user via key 42. The dividend or result of this division is then compared with a predetermined number stored in the RAM 34. This predetermined number is established by the user by setting the number of the exposure units. When the result of the division exceeds the predetermined number, the microprocessor 32 generates an output signal on its output line 56 to the alarm 54 thus warning the user that the maximum radiation dose has been reached. Otherwise, the microprocessor 32 generates signals on its output buss 58 to the display 60 which indicates the total amount of the radiation dose thus far received. The above-identified process is then repeated.

From the foregoing, it can be seen that the present invention provides a photodosimeter which not only monitors and accumulates the total ultraviolet radiation received by the user but also adjusts this total radiation by the SPF value of any sunscreen lotion or cream which has been applied to the user's skin.

Having described my invention, however, many modifications thereto will become apparent to those skilled in the art to which it pertains without deviation from the spirit of the invention as defined by the scope of the appended claims.

I claim:

1. A photodosimeter comprising:
   a housing having an opening,
   means mounted beneath said opening for generating an output signal having a magnitude proportional to the intensity of ultraviolet radiation entering said housing opening,
   means for manually inputting and storing a value corresponding to the solar protection factor of a sunscreen material,
   means for accumulating said output signals and for storing the accumulated result,
   means for dividing said accumulated result by said value corresponding to said solar protection factor,
   means for actuating an alarm when the result of said division exceeds a predetermined amount.

2. The invention as defined in claim 1 wherein said inputting means comprises a keyboard mounted to said housing.

3. The invention as defined in claim 1 wherein said generating means comprises a photocell mounted to said housing beneath said housing opening, an analog to digital converter, said photocell having an output which forms an input to the analog to digital converter.

4. The invention as defined in claim 3 wherein said accumulating means and said dividing means comprises a microprocessor.

5. The invention as defined in claim 2 and comprising means mounted to said housing for displaying a value and wherein said keyboard comprises a first key for displaying the solar protection factor on said display means, a second key for increasing the value of the solar protection factor, and a third key for decreasing the value of the solar protection factor, said second and third keys being operable to vary the value of the solar protection factor only upon the depression of said first key.

6. The invention as defined in claim 1 and comprising means for inputting and storing a further value corresponding to the relative radiation sensitivity of a person and means for varying said predetermined amount by said further value.

7. The invention as defined in claim 3 and comprising an optical filter which passes radiation only in the ultraviolet range, said filter positioned between said photocell and said opening.

* * * * *